United States Patent
Islam et al.

(10) Patent No.: US 9,434,420 B1
(45) Date of Patent: Sep. 6, 2016

(54) VEHICLE UNDERBODY STRUCTURE

(71) Applicant: FORD GLOBAL TECHNOLOGIES, LLC, Dearborn, MI (US)

(72) Inventors: Tofiqul Islam, Rochester Hills, MI (US); Behrooz Shahidi, Novi, MI (US); Lawrence Walczak, Madison Hts., MI (US); Andre Thompson, Oak Park, MI (US); John Michael McGuckin, Ann Arbor, MI (US)

(73) Assignee: Ford Global Technologies, LLC, Dearborrn, MI (US)

( * ) Notice: Subject to any disclaimer, the term of this patent is extended or adjusted under 35 U.S.C. 154(b) by 0 days.

(21) Appl. No.: 14/664,370

(22) Filed: Mar. 20, 2015

(51) Int. Cl.
*B62D 25/20* (2006.01)
*B62D 27/02* (2006.01)
*B60N 2/015* (2006.01)

(52) U.S. Cl.
CPC .......... *B62D 25/2009* (2013.01); *B60N 2/015* (2013.01); *B62D 27/023* (2013.01)

(58) Field of Classification Search
CPC ... B62D 25/20; B62D 25/2009; B60N 2/015
USPC .......................... 296/204, 30, 187.08, 193.07
See application file for complete search history.

(56) References Cited

U.S. PATENT DOCUMENTS

| | | | |
|---|---|---|---|
| 781,850 A | 2/1905 | Smith | |
| 1,525,743 A | 2/1925 | Jack | |
| 3,814,476 A | 6/1974 | Abbott | |
| 5,700,049 A | 12/1997 | Shibata | |
| 6,045,174 A * | 4/2000 | Brancaleone | B60N 2/015 296/204 |
| 7,118,167 B2 * | 10/2006 | Nakamura | B62D 21/10 296/193.07 |
| 7,204,547 B2 | 4/2007 | Okana et al. | |
| 7,237,833 B1 | 7/2007 | Moll | |
| 7,434,871 B2 * | 10/2008 | Mizuma | B60N 2/015 296/193.07 |
| 7,677,643 B2 | 3/2010 | Nakamura et al. | |
| 8,292,356 B2 * | 10/2012 | Ishigame | B62D 21/157 296/193.05 |
| 2008/0157567 A1 | 7/2008 | Rashidy et al. | |
| 2013/0257097 A1 * | 10/2013 | Kojo | B62D 25/2036 296/187.08 |

FOREIGN PATENT DOCUMENTS

WO 2014103638 A1 7/2014

\* cited by examiner

*Primary Examiner* — Jason S Morrow
*Assistant Examiner* — Emory Hicks
(74) *Attorney, Agent, or Firm* — Raymond L. Coppiellie; Brooks Kushman P.C.

(57) ABSTRACT

A vehicle is provided. The vehicle has an underbody that includes a floor panel, a pair of laterally spaced side members affixed to opposing lateral side portions of the floor panel, a plurality of cross members affixed to and spanning the pair of side members, a longitudinal member affixed to and spanning two adjacent cross members, and a mounting element affixed to the longitudinal member. The longitudinal member is configured to transfer a load from the mounting element to the adjacent cross members.

20 Claims, 4 Drawing Sheets

VEHICLE UNDERBODY STRUCTURE

TECHNICAL FIELD

The present disclosure relates to vehicular body and frame structures.

BACKGROUND

The body and frame structures of a vehicle are designed to support the loads generated by vehicle components, occupants, cargo, driving conditions, and other loads that vehicles commonly experience. In addition, the manner and location of mounting various vehicle components may vary.

SUMMARY

A vehicle underbody is provided. The vehicle underbody includes a floor panel, a pair of laterally spaced side members affixed to opposing lateral side portions of the floor panel, a plurality of cross members affixed to and spanning the pair of side members, a longitudinal member affixed to and spanning two adjacent cross members, and a mounting element affixed to the longitudinal member. The longitudinal member is configured to transfer a load from the mounting element to the adjacent cross members.

A vehicle is provided. The vehicle includes a floor panel, a pair of laterally spaced side members affixed to opposing lateral side portions of the floor panel, first and second cross members affixed to and spanning the side members, a longitudinal member affixed to and spanning the cross members, and a mounting element affixed to the longitudinal member. The longitudinal member is configured to transfer a load from the mounting element to the cross members.

A vehicle underbody is provided. The vehicle underbody includes a floor panel, a first cross member affixed to the floor panel and defining a first laterally extending closed cross section, a second cross member affixed to the floor panel and defining a second laterally extending closed cross section, a longitudinal member affixed to and spanning the cross members, and a seat mount affixed to the longitudinal member. The longitudinal member is configured to transfer a load from seat mount to the cross members.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
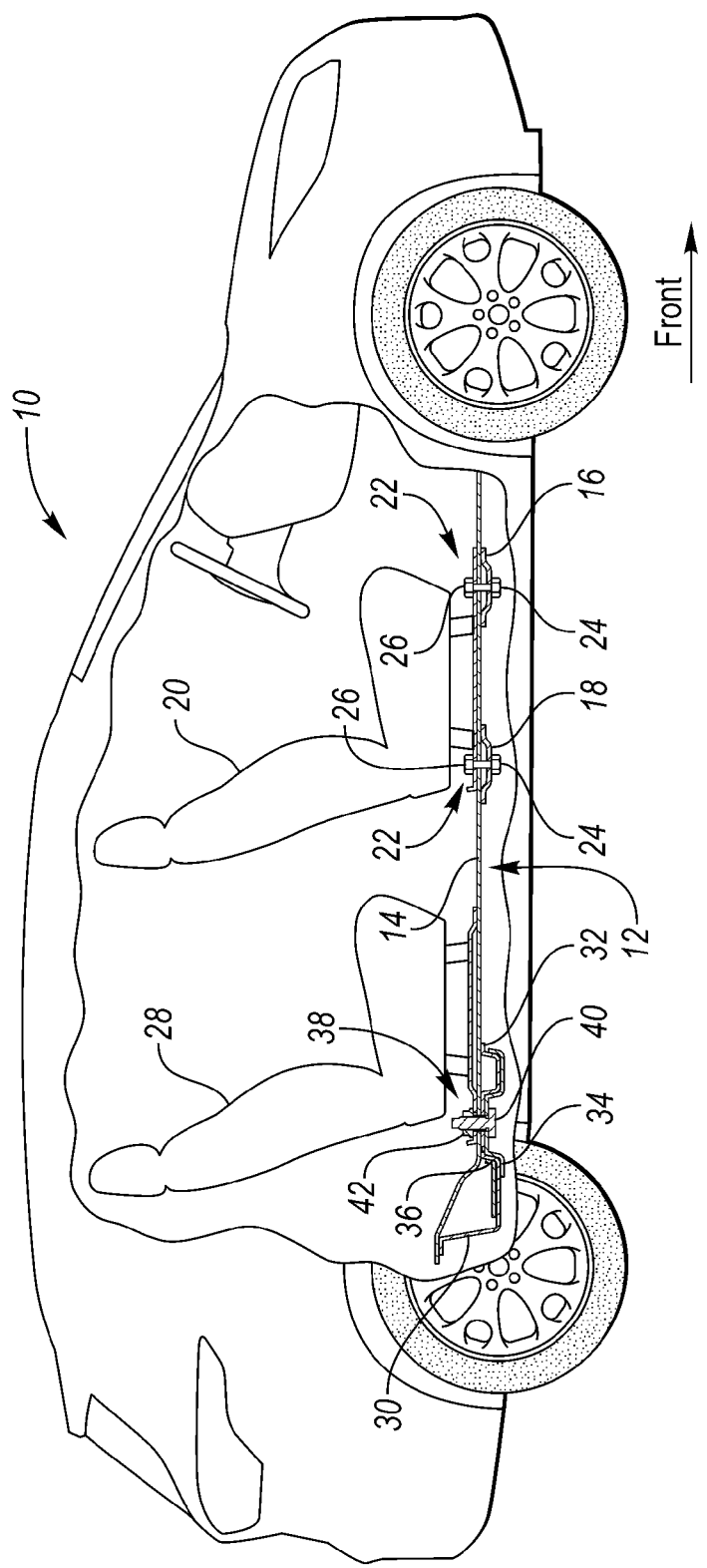
FIG. 1 is a schematic illustrating a vehicle having an arrangement of vehicle seats.

Referring to FIG. 1, a vehicle 10 is illustrated. The vehicle includes an underbody 12 that comprises a floor panel 14 and other various structural components. The underbody 12 may include one or more cross members, longitudinal members, gussets, or other structural members to provide additional support in areas where the underbody 12 may experience increased loading conditions. For example, the underbody 12 may experience increased loading conditions where a vehicle seat is secured to the vehicle underbody 12. The vehicle underbody 12 may include front cross members 16, 18 to provide additional structural support to the underbody 12 where a front vehicle seat 20 is secured to the vehicle underbody 12. At least one front seat mount 22 may be utilized to secure the front seat 20 the vehicle underbody 12. The front seat mounts 22 may consist of a bolt 24 and a nut 26. One of the bolt 24 and/or the nut 26 may be welded or in some other manner permanently affixed to a structural component of the underbody 12, for example one of the cross members 16, 18. In this case, the other of the bolt 24 and nut 26 can be fastened to the first thereby securing the seat 20.

The vehicle underbody 12 may also include additional structural support at a location where a rear seat 28 is secured to the vehicle underbody 12. The additional support of the vehicle underbody 12 may include a first cross member 30, a second cross member 32, a longitudinal member 34, at least one gusset 36, and at least one mounting element 38. The at least one mounting element 38 may consist of bolts 40 and nuts 42. In the alternative, the at least one mounting element 38 may consist of other types of fasteners such as rivets, pins, screws, snap fasteners, retaining rings, etc. The at least one mounting element 38 may be utilized for securing the rear seat 28 to the vehicle underbody 12. The bolt 40 and/or nut 42 may be welded or in some other manner permanently affixed to a structural component of the underbody 12, for example the longitudinal member 34.

FIG. 1 is not intended to be limiting. The vehicle underbody 12 may include some or all of the structural components (Cross members, longitudinal members, gussets, seat mounts, etc.) that are illustrated in FIG. 1. The vehicle underbody 12 may include additional structural components that are not shown in FIG. 1, including additional cross members, longitudinal members, gussets, seat mounts, mounts for other vehicle components, etc. The vehicle underbody 12, including various structural components, is described in further detail in the remaining Figures.

The vehicle 10 may also include more than two rows of seats, exceeding the two rows of seats depicted in FIG. 1. Some sport utility vehicles, for example, include three rows of seats. The structure of the vehicle underbody 12 as described above (and in further detail below) with respect to the rear seat 28 may be applicable to any of the rows of seats in the vehicle if the vehicle includes multiple rows of seats.

Figure 2:
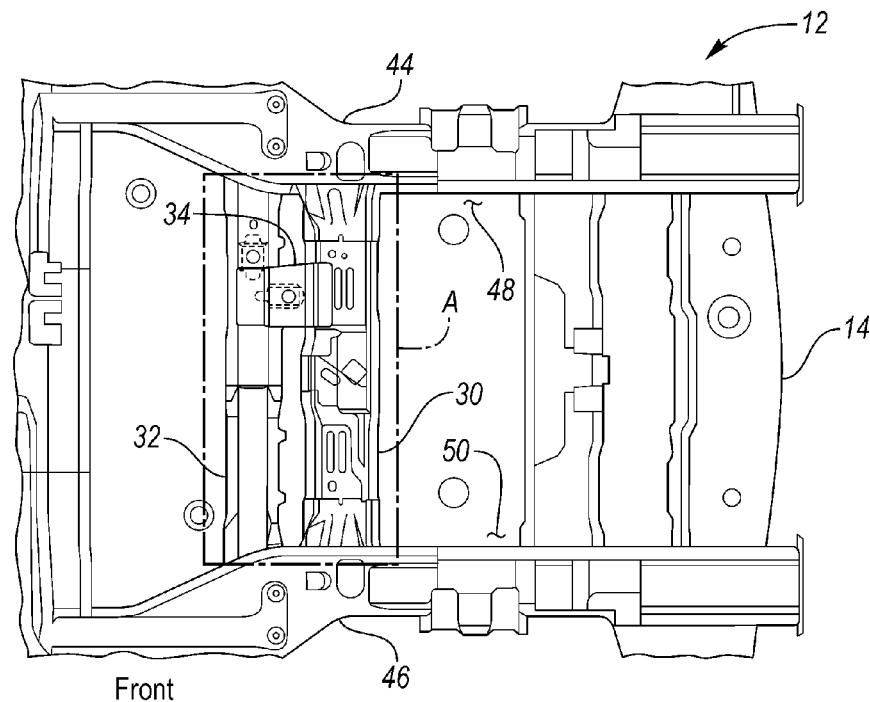
FIG. 2 is a bottom view of a vehicle underbody.

Referring to FIG. 2, a bottom view of the vehicle underbody 12 is illustrated. The vehicle underbody 12 includes a pair of laterally spaced apart side members 44, 46. Each of the pair of side members 44, 46 may be affixed to opposing lateral side portions 48, 50 of the floor panel 14. A plurality of cross members may be affixed to, and span, the pair of side members 44, 46. The plurality of cross members may include the first cross member 30, and second cross member 32. The longitudinal member 34 may be affixed to and span the first cross member 30 and second cross member 32. The plurality of members, including the first cross member 30, second cross member 32, and longitudinal member 34 may also be affixed to the floor panel 14.

Figure 3:
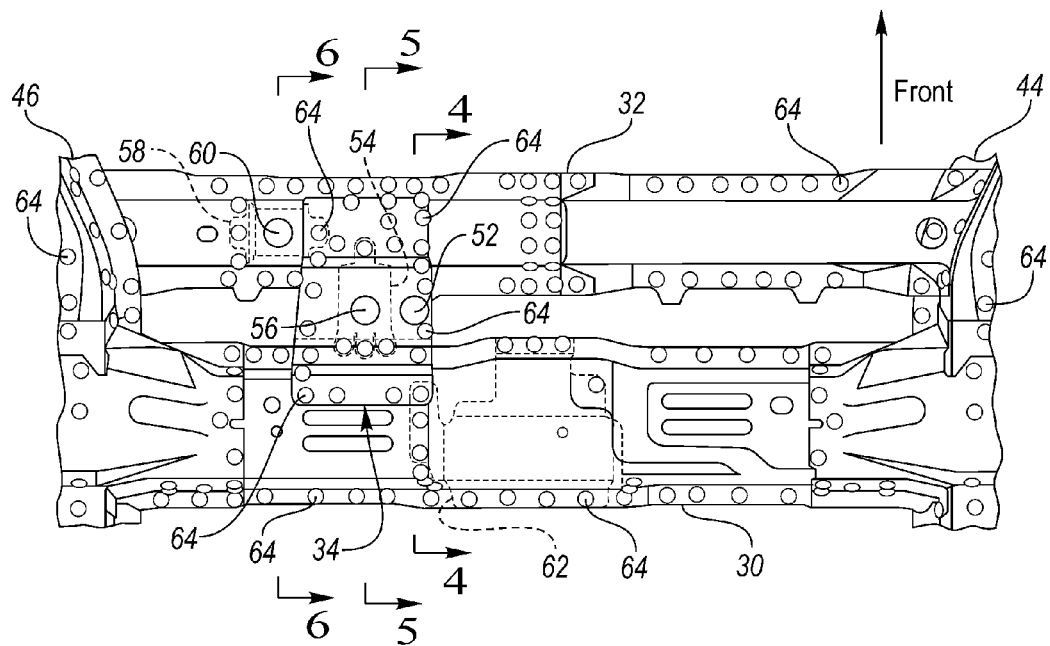
FIG. 3 is a magnified view of Detail A in FIG. 2.

Referring now to FIG. 3, Detail A of FIG. 2 depicts an additional bottom view of the vehicle underbody 12 focusing on the first cross member 30, the second cross member 32, the longitudinal member 34, and additional related components. A first mounting element 52, which may be a seat mount, may be affixed to the longitudinal member 34. The first mounting element 52 may extend from the longitudinal member 34 and through the floor panel 14. The first mounting element 52 may also extend through a portion of one or both of the first cross member 30 and second cross member 32. The first mounting element 52 may also extend through reinforcement gussets that are described below.

A first reinforcement gusset 54 may be affixed to the longitudinal member 34. The first reinforcement gusset 54 may also be affixed to the floor panel 14, the first cross member 30, or the second cross member 32. The first reinforcement gusset 54 may generally have a U-shaped cross section, and may additionally include one or more flanges that extend from portions of the U-shaped cross section. A second mounting element 56, which may be a seat mount, may be affixed to the first reinforcement gusset 54. The second mounting element 56 may be located in a "pocket" created by the U-shaped cross section of the gusset 54. The second mounting element 56 may also extend from the first reinforcement gusset 54 and through the floor panel 14. The second mounting element 56 may also extend through a portion of the longitudinal member 34, or a portion of one or both of the first cross member 30 and second cross member 32.

A second reinforcement gusset 58 may be affixed to one of the first cross member 30 and second cross member 32. The second reinforcement gusset 58 may also be affixed to the floor panel 14 and/or the longitudinal member 34. A third mounting element 60, which may be a seat mount, may be affixed to the second reinforcement gusset 58. The third mounting element 60 may extend from the second reinforcement gusset 58 and through the floor panel 14. The third mounting element 60 may also extend through a portion of the longitudinal member 34, or a portion of one or both of the first cross member 30 and second cross member 32.

A third reinforcement gusset 62 may be affixed to one of the first cross member 30 and second cross member 32. The second reinforcement gusset may also be affixed to the floor panel 14 and/or the longitudinal member 34.

The various connections between the members of the vehicle underbody 12, may be made with fasteners, rivets, adhesives, welds, or other joining methods used in the industry. In the embodiments described, the connections are depicted by a series of spot welds 64. The connections may be made between two components, such as with two thickness welds. Alternatively, the connections may be made between multiple components, such as with three thickness welds.

Figure 4:
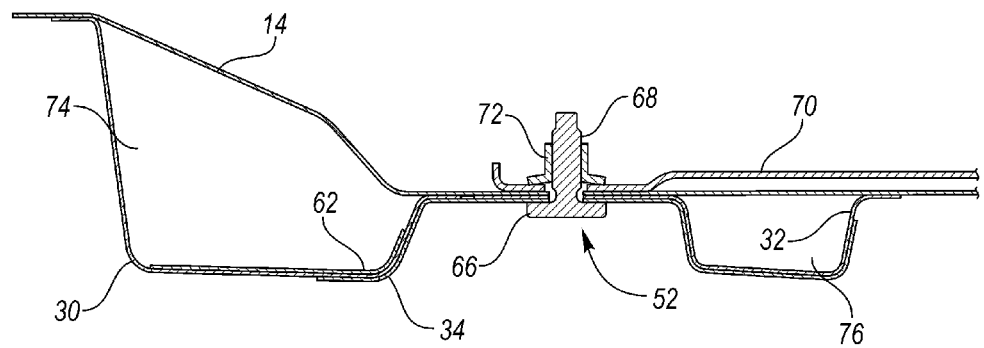
FIG. 4 is a cross sectional view of the vehicle underbody taken along line 4-4 in FIG. 3.

Referring to FIG. 4, a cross sectional view of one embodiment of the vehicle underbody 12 taken along line 4-4 of FIG. 3 is illustrated. The floor panel 14 is shown affixed to upper surfaces of the first cross member 30 and second cross member 32. The longitudinal member 34 is shown affixed to lower surfaces of the first cross member 30 and second cross member 32. The first cross member 30 defines a first laterally extending closed cross section 74. The second cross member 32 defines a second laterally extending closed cross section 76. The first mounting element 52 is shown extending through the longitudinal member 34, the second cross member 32, and the floor panel 14. The first mounting element 52 may be a bolt that includes a head portion 66 and a threaded portion 68. The first mounting element 52 may be an M10 or larger sized bolt. The head portion 66 of the first mounting element 52 may be permanently affixed to the longitudinal member 34 by welding, adhesive, etc. The head portion 66 of the first mounting element 52 may be configured to distribute load over a large surface area. For example, the head portion 66 may have a diameter of 30 mm or larger. A seat bracket 70 may be secured into position by the first mounting element 52 and an associated nut 72.

Figure 5:
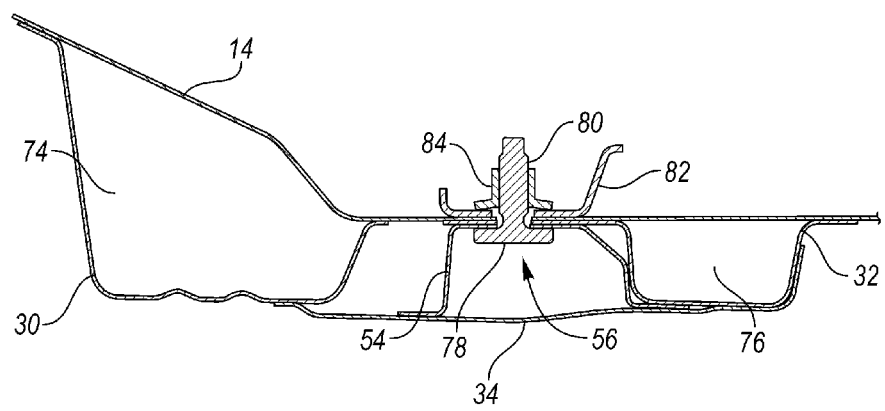
FIG. 5 is a cross sectional view of the vehicle underbody taken along line 5-5 in FIG. 3.

Referring to FIG. 5, a cross sectional view of one embodiment of the vehicle underbody 12 taken along line 5-5 of FIG. 3 is illustrated. The floor panel 14 is shown affixed to upper surfaces of the first cross member 30 and second cross member 32. The longitudinal member 34 is shown affixed to lower surfaces of the first cross member 30 and second cross member 32. The first cross member 30 defines a first laterally extending closed cross section 74. The second cross member 32 defines a second laterally extending closed cross section 76. The first reinforcement gusset 54 is shown affixed to a lower surface of the second cross member 32 and an upper surface of the longitudinal member 34. The second mounting at element 56 is shown extending through the first reinforcement gusset 54, the second cross member 32, and the floor panel 14. The second mounting element 56 may be a bolt that includes a head portion 78 and a threaded portion 80. The second mounting element 56 may be an M10 or larger sized bolt. The head portion 78 of the second mounting element 56 may be permanently affixed to the first reinforcement gusset 54 by welding, adhesive, etc. The head portion 78 of the second mounting element 56 may be configured to distribute load over a large surface area. For example, the head portion 78 may have a diameter of 30 mm or larger. A seat bracket 82 may be secured into position by the second mounting element 56 and an associated nut 84.

Figure 6:
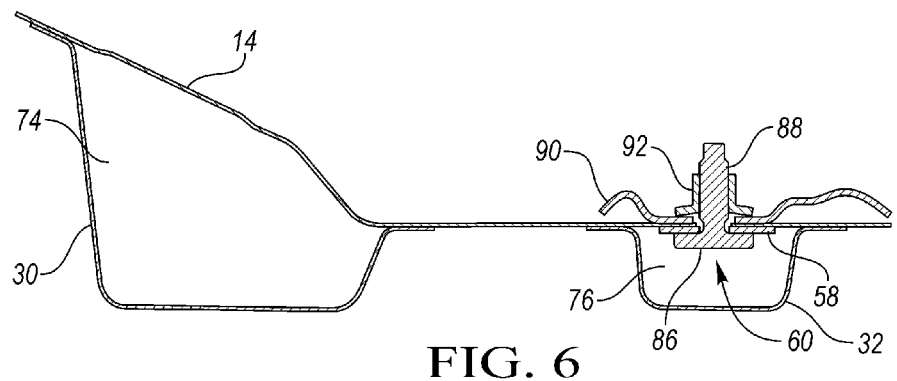
FIG. 6 is a cross sectional view of the vehicle underbody taken along line 6-6 in FIG. 3.

Referring to FIG. 6, a cross sectional view of one embodiment of the vehicle underbody 12 taken along line 6-6 of FIG. 3 is illustrated. The floor panel 14 is shown affixed to upper surfaces of the first cross member 30 and second cross member 32. The first cross member 30 defines a first laterally extending closed cross section 74. The second cross member 32 defines a second laterally extending closed cross section 76. The second reinforcement gusset 58 is shown affixed to a lower surface of the floor panel 14. The third mounting element 60 is shown extending through the second reinforcement gusset 58 and the floor panel 14. The third mounting element 60 may be a bolt that includes a head portion 86 and a threaded portion 88. The third mounting element 60 may be an M10 or larger sized bolt. The head portion 86 of the third mounting element 60 may be permanently affixed to the second reinforcement gusset 58 by welding, adhesive, etc. The head portion 86 of the third mounting element 60 may be configured to distribute load over a large surface area. For example, the head portion 86 may have a diameter of 30 mm or larger. A seat bracket 90 may be secured into position by the third mounting element 60 and an associated nut 92.

The first cross section 74 of the first cross member 30 and the second cross section 76 of the second cross member 32 operate as beams that transfer load forces to adjacent members, such as the pair of laterally spaced apart side members 44, 46. If a load is applied between a pair of cross members the load may be transferred inefficiently. Additional structural support may be added when loads are applied between a pair of cross members in order to alleviate this inefficiency. For example, the first mounting element 52 and the second mounting element 56, which are both located in between the first cross member 30 and the second cross member 32, are affixed to the vehicle underbody 12 where there is additional structural support including the longitudinal member 34 and the first reinforcement gusset 54. The additional structural support provided by the longitudinal member 34 and the reinforcement gusset 54 provide enhanced stiffness between the first cross member 30 and second cross member 32 allowing for more location flexibility of the mounting elements 52, 56, and 60.

The seat brackets 70, 82, and 90 in FIGS. 4-6 may consist of three separate mounting portions in a single seat bracket, or any combination of two or more seat brackets that may or may not have more than one mounting portion.

Figure 7:
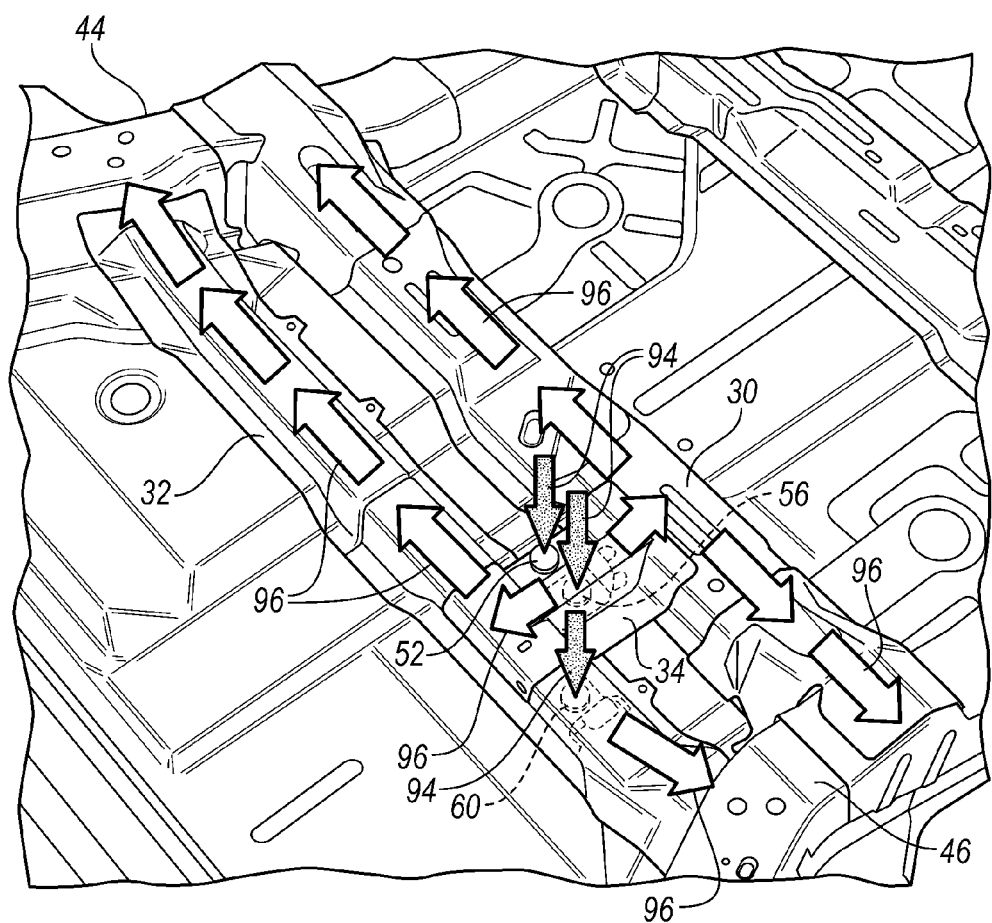
FIG. 7 is a schematic illustrating the transfer of load forces among the components of the vehicle underbody.

Referring to FIG. 7, the transfer of load forces among the components of the vehicle underbody 12 is illustrated. When loads are applied to the first, second, and third mounting elements 52, 56, 60 the loading forces are transferred from the mounting elements 52, 56, and 60 to the longitudinal member 34. The loading forces are then transferred from the longitudinal member 34 to the first cross member 30 and second cross member 32. And, finally the loading forces are then transferred from the first cross member 30 and second cross members 32 to the pair of laterally spaced apart side members 44, 46. The loading forces applied to the mounting elements 52, 56, 60 are indicated in FIG. 7 by arrows 94 from a bottom view of the vehicle underbody 12, therefore the loading forces 94 applied to the mounting elements 52, 56, 60 may include pulling forces on the mounting elements 52, 56, 60 from the upper side of the vehicle underbody 12. The loading forces distributed along the longitudinal member 34, first cross member 30, and second cross member 32 are indicated by arrows 96.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle underbody comprising:
    a floor panel;
    a pair of laterally spaced side members affixed to opposing ends of the floor panel;
    a plurality of cross members affixed to each of and spanning the pair of side members;
    a longitudinal member affixed to and spanning two adjacent cross members; and
    a mounting element affixed to the longitudinal member, wherein the longitudinal member transfers a load from the mounting element to the adjacent cross members.

2. The vehicle underbody of claim 1, wherein the mounting element comprises a bolt including a threaded portion that extends from the longitudinal member.

3. The vehicle underbody of claim 2, wherein a head of the bolt is welded to the longitudinal member.

4. The vehicle underbody of claim 1, wherein a vehicle seat is secured to floor panel with the mounting element.

5. The vehicle underbody of claim 1, wherein the plurality of cross members and the longitudinal member are affixed to the floor panel.

6. The vehicle underbody of claim 5, wherein the side members, cross members, and longitudinal member are affixed to the floor panel by a series of spot welds.

7. The vehicle underbody of claim 1, further comprising a first reinforcement gusset affixed to the longitudinal member.

8. The vehicle underbody of claim 7, further comprising a second mounting element affixed to the first reinforcement gusset, wherein the first reinforcement gusset transfers a load from the second mounting element to the longitudinal member and adjacent cross members.

9. The vehicle underbody of claim 1, further comprising a second reinforcement gusset affixed to a first one of the plurality of cross members and the longitudinal member.

10. The vehicle underbody of claim 9, further comprising a third mounting element affixed to the second reinforcement gusset.

11. A vehicle comprising:
    a floor panel;
    a pair of laterally spaced side members affixed to opposing ends of the floor panel;
    first and second cross members affixed to each of and spanning the side members;
    a longitudinal member affixed to and spanning the cross members; and
    a mounting element affixed to the longitudinal member, wherein the longitudinal member transfers a load from the mounting element to the cross members.

12. The vehicle of claim 11, wherein the mounting element comprises a bolt including a threaded portion that extends from the longitudinal member.

13. The vehicle of claim 12, wherein a head of the bolt is welded to the longitudinal member.

14. The vehicle of claim 11, wherein a rear vehicle seat is secured to the floor panel with the mounting element.

15. The vehicle of claim 11, further comprising a first reinforcement gusset affixed to the longitudinal member.

16. The vehicle of claim 15, further comprising a second mounting element affixed to the first reinforcement gusset, wherein the first reinforcement gusset transfers a load from the second mounting element to the longitudinal member and cross members.

17. A vehicle underbody comprising:
a floor panel;
a pair of laterally spaced side members affixed to opposing ends of the floor panel;
a first cross member, affixed to each of and spanning the side members, and defining a first laterally extending closed cross section;
a second cross member, affixed to each of and spanning the side members, and defining a second laterally extending closed cross section;
a longitudinal member affixed to and spanning the cross members; and
a seat mount affixed to the longitudinal member, wherein the longitudinal member transfers a load from seat mount to the cross members.

18. The vehicle underbody of claim 17, wherein a rear vehicle seat is secured to the seat mount.

19. The vehicle underbody of claim 17, further comprising a first reinforcement gusset affixed to the longitudinal member.

20. The vehicle underbody of claim 19, further comprising a second seat mount affixed to the first reinforcement gusset, wherein the first reinforcement gusset transfers a load from the second seat mount to the longitudinal member and cross members.

* * * * *